Figure 1:
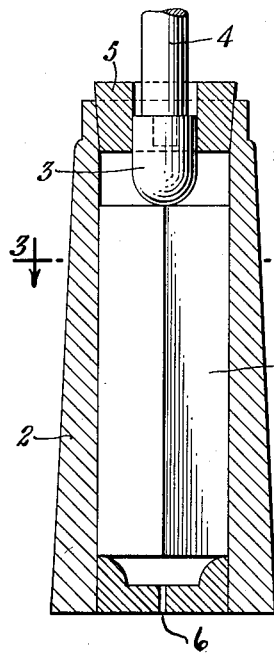

Dec. 27, 1955 H. A. FROMSON 2,728,136
METHOD FOR THE PRODUCTION OF CLAD METAL SHEETS
Filed Aug. 10, 1951

INVENTOR.
HOWARD A. FROMSON
BY
Cleveland B. Hallabaugh
ATTORNEY

United States Patent Office 2,728,136
Patented Dec. 27, 1955

2,728,136

METHOD FOR THE PRODUCTION OF CLAD METAL SHEETS

Howard A. Fromson, New York, N. Y., assignor to Integral Clad Metals Company, New York, N. Y., a partnership Application August 10, 1951, Serial No. 241,268

7 Claims. (Cl. 29—475)

This invention relates to a method for the production of clad metal sheets.

Clad metal sheets which combine the advantageous properties of two different metals are finding increasing use in many fields. The corrosion resistant alloys, for example, are considerably more expensive than ordinary steel, but lack many of its advantages as a structural metal. However, a sheet of steel clad with a relatively thin outer skin of a corrosion resistant alloy has the advantageous corrosion resistance of the alloy, combined with the structural advantages of the steel and is less expensive than a sheet of the corrosion resistant alloy of the same strength. Such sheets are, for example, finding wide use in the chemical industry for the fabrication of reaction vessels and other chemical equipment which must come into contact with various types of corrosive solutions and vapors.

The production of clad sheets presents a problem arising from the fact that the two different metals must be firmly welded together. The metals will weld only when clean surfaces of the metal are in intimate contact at a welding temperature. On the other hand, a sheet of, for example, ordinary steel which has been thoroughly cleaned of scale and other foreign matter at room temperature will become heavily coated with oxide when heated to a welding temperature.

Various methods have been developed by which clad sheets have been produced. The details of some of the more successful methods have, at least in part, been surrounded by secrecy. One such method by which ordinary steel is clad with one of the so-called stainless steel alloys consists of treating the surfaces of steel and stainless steel ingots with an aqueous solution of chemicals, the composition and exact action of which is maintained in secrecy, the treated surfaces of the ingots placed in contact and the two ingots welded together along the contacting edges of the two surfaces. The composite ingot thus formed is heated to a temperature at which the metals are malleable and rolled into a plate or sheet. During this rolling procedure, the two metals are welded together so that when the sheet or plate is trimmed or cut into smaller pieces, the two layers of metal do not separate.

Despite the secrecy surrounding the nature of the treating solution utilized in this particular process, it is obviously an expensive one in view of both the aqueous treatment and the manual welding of the edges of the ingots. In general, the processes which have been proposed involve the use of special equipment and supplemental procedures which materially increase the cost of the clad sheets.

Now, it is the object of this invention to provide a method for the production of clad sheets, plates or strips which utilizes standard piercing and rolling equipment without alteration or complication and does not require special equipment or procedures.

Another object of this invention is to provide a method in which clad sheets may be rolled in a single continuous operation while utilizing the heat present in the original billet.

Further objects and advantageous features of this invention will be readily apparent from the detailed description thereof which follows.

The method in accordance with this invention for the production of clad plates, sheets or strips comprises essentially the piercing of a hot billet of metal which is to form one of the layers of the clad plate, sheet or strip to produce a cylindrical hole or cavity in the billet having a fresh metal surface entirely free of oxides or other foreign matter, positioning in the hole or cavity thus formed a closely fitting cylinder of another metal with a clean outer surface, entirely free of scale or other oxides, and reducing the composite cylindrical block of metal thus formed to a plate, sheet or strip of clad metal having the desired thickness by mechanical working.

In carrying out this method, I may position either a hollow or solid cylinder of the second metal in the cavity which I pierce in the billet of metal. The alternative I choose determines the exact procedure I follow in mechanically reducing the composite billet to a sheet. In the alternative in which I use a hollow cylinder, I cut off the lower end of the billet, slit the composite wall of the billet lengthwise and open it outwardly to form a composite block which I then roll into a plate or sheet. This procedure produces a bimetallic plate or sheet with cladding on only one side. In the other alternative, I merely roll the solid composite billet to a composite block and, finally, to a plate or sheet. This alternative produces a bimetallic plate or sheet which has cladding of the same metal on both of its outer surfaces.

By a variant of the alternative procedure in which I insert a hollow cylinder into the pierced billet, I may produce either a bimetallic or a trimetallic plate or sheet, of three layers of metal, i. e., one which has a core layer of one metal, having another metal on each of its outer surfaces, or having different metals on its outer surfaces. In this variant, I position a hollow cylinder of metal just inside the inner surface of the die of the piercing press, position the hot billet inside this cylinder and then pierce the billet, insert a second cylinder in the hole and reduce the resulting billet to a plate or sheet by mechanical working.

The hollow cylinder or the solid cylinder is inserted into the cavity or hole in the metal billet, simultaneously with or immediately after the piercing operation and before scale has a chance to form on the new surface of the billet. The piercing operation may be carried out with the ordinary piercing mandrel and the hollow or solid cylinder immediately inserted into the cavity. Alternatively, a sleeve may be introduced simultaneously with the piercing operation by positioning it around the shank of a specially designed piercing mandrel or a solid cylinder may be used as its own piercing mandrel, as will be more fully explained hereinafter.

In the alternative in which a hollow cylinder, tube or sleeve is inserted into the cavity of the pierced billet, the metal of the billet is preferably the one which forms the thicker layer of the final plate or sheet, if one layer is to be thicker than the other, as is ordinarily the case. It may be any one of a number of different metals, although iron, steel or an alloy steel is most frequently used for this purpose. It is heated to an elevated temperature at which it is malleable and readily pierced and rolled to reduce its thickness, and at which it readily welds to the sleeve of metal placed in contact with it. The exact temperature used will depend upon the particular metals involved, but in any case will be below, but near the melting point of the billet metal. I have found, for example, that a temperature within the range of about 2250° F. to about 2450° F. is satisfactory in the case of an ordinary steel billet.

The sleeve or tube of cladding metal which is inserted into the pierced billet may be any one of the metals used in cladding other than the one which forms the billet. It may also be one of the metals used in bimetallic elements temperature measurement since my process may be used for the production of bimetallic sheets to be cut into such elements, as well as the bimetallic sheets ordinarily referred to as "clad" sheets. The sleeve may, for example, be an alloy steel of any one of the numerous types which have been developed for special purposes, copper, a copper alloy, nickel, or a nickel alloy. The temperature at which it is inserted into the pierced billet will depend upon its own melting point and its thickness, but will ordinarily approximate the prevailing atmospheric temperature.

The hole or cavity made in the billet by the piercing operation is the exact diameter of the sleeve or tube of cladding metal to be inserted therein, so that its surface of the sleeve comes into close contact with the freshly formed surface of the billet. The sleeve may be inserted into the heated billet of metal immediately after the piercing tool is withdrawn from the hole which it produces. Alternatively, the sleeve of cladding metal may be positioned on the body of the piercing mandrel, behind a detachable piercing head on the mandrel and inserted into the hot billet during the piercing operation. In following this alternative, both the sleeve of cladding metal and the mandrel head are left in the metal billet, as the body of the mandrel is withdrawn after the piercing operation. The head of the mandrel can be readily recovered after the closed end of the billet is cut off preparatory to splitting and opening it.

In the variant of the foregoing procedure in which I produce a plate, sheet or strip consisting of a core layer clad on both of its outer surfaces, a sleeve of cladding metal is positioned inside the die which holds the hot billet, between the interior of the die and the exterior of the hot billet. The billet is then pierced, and the internal cladding sleeve inserted as described hereinbefore. The two cladding sleeves which are used may be of the same or different metals, but will be of different metal from that of the billet.

The closed end of the composite block is cut off, it is slit and flattened, and finally rolled immediately after the piercing and insertion of the internal sleeve or tube and before it has a chance to cool to a temperature below the malleable range of the block. The thickness of the final plate or sheet which is produced is, of course, determined by the rolling operation. However, the relative thickness of the two or three layers of metal which form the clad sheet is determined by the dimensions of the original billet and of the cladding sleeve or sleeves which are used.

In the alternative method in accordance with this invention by which I clad both surfaces of a metal sheet and avoid the steps of slitting and opening a cylindrical billet, I pierce a hot billet of the metal which is to form the external cladding layers and insert a solid rod of the metal which is to form the central layer of the clad sheet. The billet may be pierced with a piercing mandrel which has the same external diameter as that of the rod to be inserted into the resulting hole, and the rod inserted into the hole immediately after the piercing mandrel is withdrawn. Alternatively, the rod itself may be provided with a rounded or pointed end and forced directly into the billet, thus functioning as its own piercing mandrel.

In following either of these alternatives, it is desirable to heat the billet to a temperature below its melting point at which it is malleable. It is also desirable to heat the rod of metal which is inserted into the billet to prevent it from chilling the billet, particularly when it is relatively large as compared with the billet. In the alternative in which the rod functions as its own piercing mandrel, the temperature to which it is heated should not be high enough to cause it to be more malleable than the metal of the billet and in neither alternative should its temperature exceed the melting point of the metal of the billet. Also, in the case of both alternatives, the surface of the rod should be free of scale and other foreign matter when it is inserted into the billet.

Figure 2:
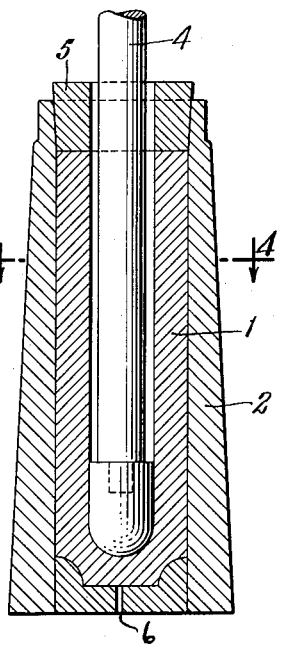
Figure 3:
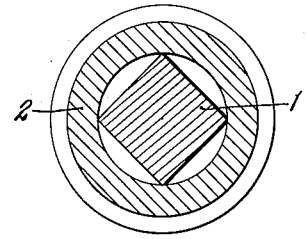
Figure 4:
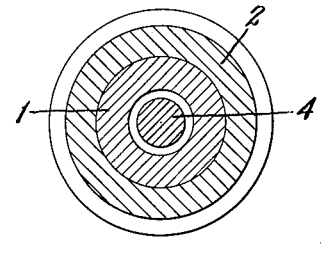
Figure 5:
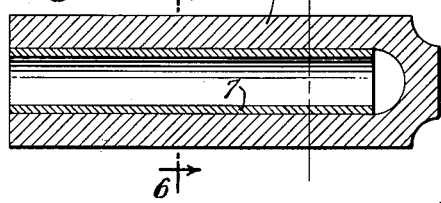
Figure 6:
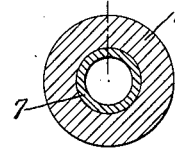
Figure 7:
Figures 8, 9, 10:
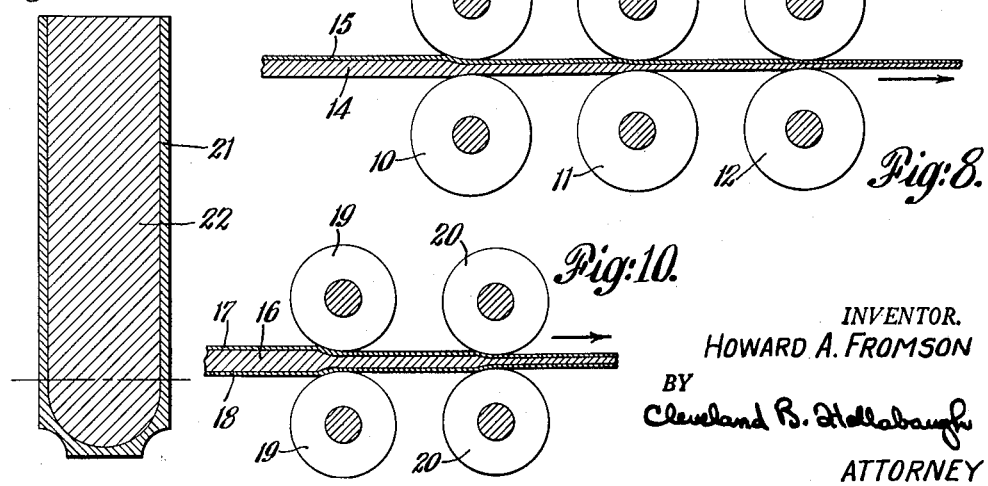

Having now described the general nature of this invention, I will now proceed with a detailed description of a specific embodiment thereof with reference to the accompanying drawing in which like reference characters are utilized to refer to like parts wherever they occur. In the drawings:

Figure 1 is a diagrammatic, cross-sectional, elevation view of a block or billet positioned in the die of a hydraulic press prior to the piercing operation, Figure 2 is a cross-sectional, elevational view of a block or billet positioned in the die of a hydraulic press after the piercing operation, Figure 3 is a cross-sectional, plan-view taken along the section line 3—3 of Figure 1, Figure 4 is a cross-sectional, plan-view taken along the section line 4—4 of Figure 2, Figure 5 is a cross-sectional view of a pierced billet into which a tube or sleeve of cladding metal has been inserted, Figure 6 is a cross-sectional view of an internally clad billet taken along the section line 6—6 of Figure 5, Figure 7 is a cross-sectional view of an internally clad billet which has been slit and opened outwardly, Figure 8 is a diagrammatic cross-sectional view of the rolling of the flattened clad block to produce a clad sheet, Figure 9 is a cross-sectional view of a pierced billet into which a solid rod of metal has been inserted to form the internal layer of a sheet clad on both surfaces with the billet metal, and Figure 10 is a diagrammatic cross-sectional view of the rolling of the billet of Figure 9 to produce a sheet which is clad on both surfaces.

Figures 1 and 3 show a billet 1 positioned within the die 2 of a hydraulic press preparatory to carrying out the piercing step of the method in accordance with this invention. In this method, the billet 1, shown as being square in cross-section, is heated to a temperature at which it is malleable before being positioned in the die 2. In the case of a steel billet this temperature is about 2400° F.

In Figure 1 it will be seen that the billet 1 is placed with its long axis in the vertical position and is centered under the head 3 of the piercing spike or mandrel 4, which is guided and centered by a ring 5 positioned in the top of the die 2. The die 2 is provided with an air vent 6 to allow entrapped air to escape below the billet 1 during the piercing operation.

The diameter of the head 3 of the mandrel is the same as that of the cladding tube or sleeve it is desired to insert in the billet 1. The body 4 of the mandrel may have the same diameter as its head 3, but is preferably somewhat smaller in diameter, as illustrated by the Figures 1, 3 and 4 to facilitate its removal from the billet after the piercing operation has been carried out. As noted hereinafter, to utilize one of the alternative procedures for inserting the sleeve into the hole in the billet 1, it is necessary to utilize a mandrel body 4 which has a diameter equal to or less than the internal diameter of the sleeve to be inserted into the billet.

Figures 2 and 4 show the billet 1 after it has been pierced by the downward movement of the mandrel 4 and its head 3 as a result of force supplied by a hydraulic press (not shown by the drawing). It will be noted in Figure 2 that the billet 1 now has a hole down its center axis and that it has become round in cross-section and has entirely filled the interior of the die 1.

Figures 5 and 6 show the billet 1 after the sleeve of cladding metal 7 has been inserted into the hole produced by the piercing operation. The sleeve 7 may be inserted into the billet 1 after the piercing mandrel has been withdrawn and either before or after it is removed from the die 2 of the hydraulic press. It is essential, however, that this sleeve be placed in position immediately following the piercing operation, to avoid scale formation on the newly formed interior surfaces of the billet 1. Normally no flux or other bonding medium is required between the interior of the pierced billet 1 and the exterior surface of the sleeve 7, provided that it is clean and free of oxides when it is inserted into the billet.

Alternatively, the internal sleeve 7 may be positioned in the billet 1 in the same operation in which the billet 1 is pierced. This can be accomplished by the use of a piercing mandrel 4 which has a detachable head 3 and is smaller in diameter than the head 3 and equal to or smaller in diameter than the internal diameter of the sleeve 7 to be inserted. To carry out this procedure, the sleeve 7 is positioned around the mandrel 4, before the head 3 is positioned on its end. The piercing operation is then carried out by thrusting the mandrel 4, its sleeve 7 and its head 3 downwardly into the block 1. The mandrel is then withdrawn, leaving the head 3 and the sleeve 7 positioned in the billet 1. The head 3 may be recovered by cutting off the end of the billet in which it is embedded, or it may be carried through part or all of the elongation operation and recovered by cutting off the end of the elongated tube at an intermediate or final stage of the elongation.

This alternative procedure is a desirable one in that the external surface of the sleeve 7 is positioned against the internal surface of the block 1 as soon as it is formed, leaving no opportunity for it to come into contact with air and to form scale.

After the internal cladding sleeve is positioned in the hole of the billet 1 by one of the hereinbefore described alternatives, to produce the structure shown in Figures 5 and 6, the closed end of the billet is cut off, for example, along the dotted line of Figure 5 to produce an open ended composite cylinder which is then slit along its length, for example, at the dotted line of Figure 5, while the billet is still hot and malleable. The cylindrical wall of the billet is then opened outwardly at the slit and finally flattened to produce a composite block of metal. Figure 7 shows the opened cylinder in an intermediate stage in this opening and flattening step.

The flat, composite block of metal resulting from this opening and flattening step is then passed through a series of rolls to reduce the thickness of each of its layers and produce a clad sheet of the desired final thickness. This rolling step, illustrated diagrammatically by Figure 8, is, preferably, carried out while the metals are still at an elevated temperature at which they are malleable. Ordinarily, it is unnecessary to reheat the composite block or the partially rolled sheet, although under some circumstances, with some combination of metals, at least one reheating step is desirable to keep the metals malleable or to anneal them to relieve strains, or both.

Figure 8 shows the composite sheet being passed through three pairs of rolls, 10—10, 11—11, and 12—12. The number of pairs of rolls through which the sheet is passed or alternatively the number of times it is passed through a single pair of rolls can be varied widely and will depend upon the particular metals which form the composite sheet and the extent to which the composite block is reduced in thickness by the rolling procedure.

It will be noted in Figure 8 that both the layer of metal 14 derived from the original billet 1 and the layer 15 derived from the original sleeve 7 are reduced in thickness. The relative thickness of these layers is determined by the relative sizes of the billet 1 and the thickness and diameter of the cladding sleeve 7 which are originally used. Ordinarily, I prefer to use the billet 1 to furnish the metal for the thicker of the two layers of the final sheet and the sleeve 7 to furnish the metal for the thinner layer which is usually termed the cladding layer.

By a variant of this method, I may produce a sheet of metal which consists of three layers of metal, the outer layers of which may be the same or different metals. In this variant of my method, I position a sleeve of metal just inside the inner surface of the die 2 of the press, position the heated billet 1 inside this sleeve and carry out the piercing operation and the insertion of an internal sleeve by either of the alternative procedures described hereinbefore. The resulting composite billet is identical with that shown by Figures 5 and 6, except for the presence of an additional layer of metal around the outside of the pierced billet 1. This trimetallic billet is then carried through the steps of cutting off its end, slitting it lengthwise, opening and flattening it into a composite block and finally rolling it into a sheet in exactly the same way as described hereinbefore in the case of the bimetallic billet illustrated by Figures 5 and 6.

Figure 10 shows the rolling of a trimetallic sheet, such as that produced by this variant of my method, in which a sheet consisting of a central layer 16 derived from the billet 1 and outer layers 17 and 18 one of which is derived from the outer cylinder of metal positioned just inside the press die and the other of which is derived from the sleeve which is positioned inside the pierced billet, is passed through two pairs of rolls 19—19 and 20—20 to reduce its thickness. The outer cladding layers 17 and 18 may be of the same metal or of different metals and may be of the same thickness or different thicknesses as may be desired. In general, they will be considerably thinner than the central layer of metal 16.

By still another alternative embodiment of the method in accordance with this invention, I may produce a composite sheet of metal composed of three layers, the two outer or surface layers of which are of the same metal and are derived from a billet which is pierced on a press. In producing such a sheet, I pierce a hot billet 1 while positioned in a die 2 as illustrated in Figures 1 and 2 by the use of a piercing mandrel. I then insert into the hole thus made a solid rod of metal to produce a composite billet, such as, that illustrated by Figure 9. The outer layer of metal 21 of that billet is derived from the billet 1 while the solid core 22 is derived from the rod which is inserted into the hole made by the mandrel 4.

As in the case of the alternative embodiments of my method described hereinbefore, I heat the billet 1 to an elevated temperature below its melting point at which its metal is malleable. I also heat the rod which I insert into the pierced billet to an elevated temperature below its melting point and that of the billet and insert it into the pierced billet while its surface is free of scale or other foreign matter.

In a variant of this method, I may produce the composite billet illustrated by Figure 9 by a piercing operation in which I use the rod which forms the core 22 of the billet as its own piercing mandrel. As in the case of the other variant, I heat the billet 1 to a temperature below its melting point at which it is malleable and I heat the rod of metal which forms the core 22 to an elevated temperature at which it is less malleable than the hot metal of the billet.

The cylindrical billet illustrated by Figure 9 is reduced to a block by passing it lengthwise through reducing rolls while it is still hot and finally to a sheet by continued passes through reducing rolls. Figure 10 illustrates a later stage in the reduction of such a billet to a clad sheet. In the case of this embodiment the central layer 16 of the sheet is derived from the core 22 of the composite billet of Figure 9, while the top and bottom layers 17 and 18 are of the same metal and are derived from the outer layer 21 of the composite billet of Figure 9 and originally from the billet 1 which is pierced.

I have found that the edges of the plate or sheet parallel to the axis of the original billet are not composite but are entirely the metal of the billet which was originally pierced. The width of these non-composite edges of the sheet is determined by the relationship between the size of the composite billet illustrated by Figure 9, the thickness of its outer layer 21, the thickness of the rolled plate, sheet or strip which is produced, and to some extent the exact rolling technique which I use to reduce the composite billet. I trim these non-composite edges from the composite portion of the sheet which forms the major portion of its width and utilize them as scrap.

The method in accordance with this invention is particularly advantageous in that it produces clad sheets in which the different layers of metal are firmly welded together by the use of standard, well tested equipment, without the necessity for using complex and expensive supplemental procedures and equipment.

What I claim and desire to protect by Letters Patent is:

1. A method for the production of a seamless, clad metal sheet, which comprises the essential steps of heating a billet of metal which is to form one layer of the clad sheet to an elevated temperature at which it is malleable and which is below but near its melting point, rapidly piercing the hot billet and inserting into the hole so formed a closely fitting cylinder of a different metal which is at a temperature substantially lower than that of the pierced billet and has an outer surface which is clean and substantially free of oxide, before scale forms on the newly created surface of the billet, permitting the said cylinder to equalize its temperature with that of the said billet and to weld its outer surface to the inner surface of the billet under the elevated temperature and the interfacial pressure resulting from its tendency to thermal expansion created by the increase in its temperature, and reducing the resulting composite billet to a sheet by mechanical working while it is still at an elevated temperature.

2. A method for the production of a seamless, clad metal sheet, which comprises the essential steps of heating a billet of metal which is to form one layer of the clad sheet to an elevated temperature at which it is malleable and which is below but near its melting point, rapidly piercing the hot billet and inserting into the hole so formed a closely fitting hollow cylinder of a different metal which is at a temperature substantially lower than that of the pierced billet and has an outer surface which is clean and substantially free of oxide, before scale forms on the newly created surface of the billet, permitting the said cylinder to equalize its temperature with that of the said billet and to weld its outer surface to the inner surface of the billet under the elevated temperature and the interfacial pressure resulting from its tendency to thermal expansion created by the increase in its temperature, and while the billet is at an elevated temperature, cutting off its closed end to form a composite cylinder open at both ends, splitting the composite cylinder along its length, opening and flattening it outwardly and rolling the flat composite thus formed into a sheet.

3. A method for the production of a seamless, clad metal sheet, which comprises the essential steps of heating a billet of metal which is to form one layer of the clad sheet to an elevated temperature at which it is malleable and which is below but near its melting point, rapidly piercing the hot billet and inserting into the hole so formed a closely fitting solid cylinder of a different metal which is at a temperature substantially lower than that of the pierced billet and has an outer surface which is clean and substantially free of oxide, before scale forms on the newly created surface of the billet, permitting the said cylinder to equalize its temperature with that of the said billet and to weld its outer surface to the inner surface of the billet under the elevated temperature and the interfacial pressure resulting from its tendency to thermal expansion created by the increase in its temperature, and while the composite cylinder is at an elevated temperature, rolling it into a sheet.

4. A method for the production of a seamless, clad metal sheet which comprises the essential steps of heating a billet of metal which is to form one layer of the clad sheet to an elevated temperature at which it is malleable and which is below but near its melting point, rapidly piercing the hot billet with a mandrel having a detachable head and having positioned around its body a sleeve of cladding metal which has an external diameter substantially equal to the diameter of the said detachable head, which has a clean outer surface substantially free of oxide and is at a temperature substantially lower than that of the billet, withdrawing the said mandrel body from the said sleeve of cladding metal leaving the mandrel head and the sleeve of cladding metal positioned in the newly created hole in the billet, permitting the said sleeve to equalize its temperature with that of the said billet and to weld its outer surface to the inner surface of the billet under the elevated temperature and the interfacial pressure resulting from its tendency to thermal expansion created by the increase in its temperature, and while the billet is at an elevated temperature, cutting off the closed end of the billet carrying the mandrel head embedded therein to form a composite cylinder open at both ends, splitting the composite cylinder along its length, opening and flattening it outwardly and rolling the flat composite thus formed into a sheet.

5. A method for the production of a seamless, clad metal sheet which comprises the essential steps of heating a billet of metal which is to form one layer of the clad sheet to an elevated temperature at which it is malleable and which is below but near its melting point, rapidly piercing the hot billet with a solid cylinder of a different metal which is at a temperature substantially lower than that of the billet and has an outer surface which is clean and substantially free of oxide, permitting the said cylinder to equalize its temperature with that of the said billet and to weld its outer surface to the inner surface of the billet under the elevated temperature and interfacial pressure resulting from its tendency to thermal expansion created by the increase in its temperature, and while the resulting composite cylinder is at an elevated temperature, rolling it into a sheet.

6. A method for the production of a stainless steel clad steel sheet which comprises the essential steps of heating a steel billet to an elevated temperature at which it is malleable and which is below but near its melting point, rapidly piercing the hot billet with a mandrel having a detachable head and having positioned around its body a sleeve of stainless steel which has an external diameter substantially equal to the diameter of the said detachable head, which has a clean outer surface substantially free of oxide and is at a temperature substantially lower than that of the billet, withdrawing the said mandrel body from the said stainless steel sleeve leaving the mandrel head and the stainless steel sleeve positioned in the newly created hole in the billet, permitting the said sleeve to equalize its temperature with that of the said billet and to weld its outer surface to the inner surface of the billet under the elevated temperature and the interfacial pressure resulting from its tendency to thermal expansion created by the increase in its temperature, and while the billet is at an elevated temperature, cutting off the closed end of the billet carrying the mandrel head embedded therein to form a composite cylinder open at both ends, splitting the composite cylinder along its length, opening and flattening it outwardly and rolling the flat composite thus formed into a sheet.

7. A method for the production of a steel sheet which is clad on both of its surfaces with stainless steel which comprises the essential step of heating a stainless steel billet to an elevated temperature at which it is malleable, and which is below but near its melting point, rapidly piercing the hot billet with a solid steel cylinder which is at a temperature substantially lower than that of the billet and has an outer surface which is clean and substantially free of oxide, permitting the said cylinder to equalize its temperature with that of the said billet and to weld its outer surface to the inner surface of the billet under the elevated temperature and interfacial pressure resulting from its tendency to thermal expansion created by the increase in its temperature, and while the resulting composite cylinder is at an elevated temperature, rolling it into a sheet.

References Cited in the file of this patent

UNITED STATES PATENTS

| | | |
|---|---|---|
| 674,394 | Beck | May 21, 1901 |
| 831,887 | Nicholson | Sept. 25, 1906 |
| 860,232 | Offutt | July 16, 1907 |
| 959,518 | Griffith | May 31, 1910 |
| 1,011,744 | Clamens | Dec. 12, 1911 |
| 1,078,906 | Eldred | Nov. 18, 1913 |
| 1,101,729 | Davis | June 30, 1914 |
| 1,122,675 | Baldwin | Dec. 29, 1914 |
| 1,580,647 | Breck | Apr. 13, 1926 |
| 1,883,205 | Whitehead | Oct. 18, 1932 |
| 1,891,943 | Nimick | Dec. 27, 1932 |
| 1,938,633 | Maskrey | Dec. 12, 1933 |
| 2,107,943 | Hopkins | Feb. 8, 1938 |
| 2,109,138 | Maulen | Feb. 22, 1938 |
| 2,177,435 | Kretz | Oct. 24, 1939 |
| 2,438,405 | Kinnear | Mar. 23, 1948 |